United States Patent [19]
Dow et al.

[11] Patent Number: 5,956,536
[45] Date of Patent: Sep. 21, 1999

[54] CAMERA OPTICAL ACCESSORIES THEREFOR AND METHOD OF USE

[75] Inventors: Joseph J. Dow, Belmont; Jeffrey J. Parker, Millis; Duncan C. Sorli, Chelmsford, all of Mass.

[73] Assignee: Polaroid Corporation, Cambridge, Mass.

[21] Appl. No.: 08/700,820

[22] Filed: Aug. 21, 1996

[51] Int. Cl.⁶ .................................................. G03B 13/20
[52] U.S. Cl. ............................................. 396/164; 396/74
[58] Field of Search .................................. 396/61, 63, 65, 396/74, 159–163, 164, 166, FOR 713

[56] References Cited

U.S. PATENT DOCUMENTS

| | | | |
|---|---|---|---|
| 3,418,908 | 12/1968 | Land .......................................... | 396/61 |
| 4,066,884 | 1/1978 | Taylor ........................................ | 362/16 |
| 4,417,798 | 11/1983 | Ohkura et al. . | |
| 4,422,744 | 12/1983 | Maida . | |
| 4,443,082 | 4/1984 | Murano et al. . | |
| 4,477,164 | 10/1984 | Nakai et al. . | |
| 4,494,850 | 1/1985 | Katsuma et al. ......................... | 354/416 |
| 4,509,846 | 4/1985 | Nakai et al. . | |
| 4,540,262 | 9/1985 | Nakai et al. . | |
| 4,560,267 | 12/1985 | Nakai et al. . | |
| 4,673,275 | 6/1987 | Nakai et al. . | |
| 4,733,258 | 3/1988 | Kojima . | |
| 4,912,494 | 3/1990 | Tanaka et al. . | |
| 4,958,181 | 9/1990 | Ishikawa et al. . | |
| 4,978,986 | 12/1990 | Hatch ....................................... | 354/295 |
| 5,126,780 | 6/1992 | Satou et al. . | |
| 5,142,299 | 8/1992 | Braun ....................................... | 354/64 |
| 5,214,464 | 5/1993 | Karasaki et al. . | |
| 5,287,138 | 2/1994 | Shiokama et al. . | |
| 5,382,994 | 1/1995 | Naito et al. . | |
| 5,448,323 | 9/1995 | Clark et al. . | |
| 5,481,326 | 1/1996 | Yasukawa . | |
| 5,557,366 | 9/1996 | Hirai et al. .............................. | 354/416 |

FOREIGN PATENT DOCUMENTS 406273820  9/1994  Japan .

*Primary Examiner*—Eddie C. Lee
*Assistant Examiner*—Michael Dalakis
*Attorney, Agent, or Firm*—Leslie Payne

[57] ABSTRACT

A close-up camera having a plurality of selectable exposure parameters such as variations in magnification, exposure trim and flash illumination includes a lookup table programmed to define follow focus flash illumination in accordance with the parameters selected. Preferably, the camera includes a plurality of exposure lenses, a pair of strobes, an exposure trim selector and a look-up table programmed to define a quench time for the strobes in accordance with the parameters selected. Filter accessories, configured to extend across the camera face, are also provided to modify both the scene light passing to the exposure lens and the illumination from the flash strobes, and the camera includes both additional look-up table capacity for selecting a proper quench time to account for the filter accessory, and means for interfacing with the accessory to automatically modify camera operation in accordance therewith. To facilitate mounting on and removal from the camera, the filter accessory includes a moveable side operable to open and close the facing sides of the accessory.

12 Claims, 8 Drawing Sheets

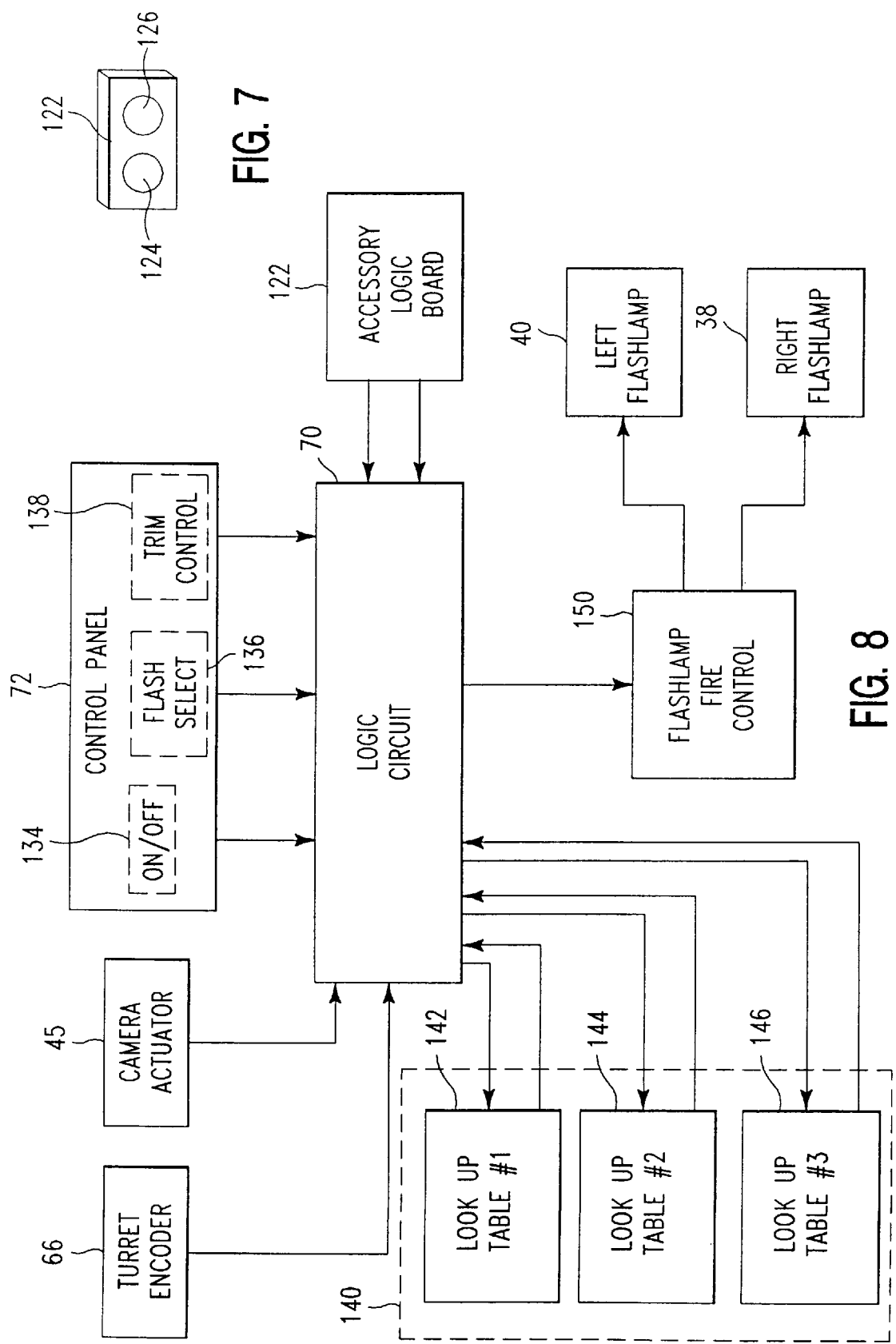

CAMERA OPTICAL ACCESSORIES THEREFOR AND METHOD OF USE

BACKGROUND OF THE INVENTION

This invention relates to photographic apparatus and their accessories and, more particularly, to camera and optical accessories therefor as well as a method of use.

Close-up photography is commonly utilized in many different fields, as for example, scientific and medical fields, to visually record information for a variety of purposes. In this regard, U.S. Pat. No. 5,448,323, issued to Clark et al. on Sep. 5, 1995, which is incorporated herein by reference, describes a close-up camera employing a plurality of fixed focus, exposure lenses, each having a different magnification and being mounted on a rotatable turret. The turret, in turn, carries a pair of ranging lenses in association with each exposure lens, such that incremental rotation of the turret results in successive ones of each exposure lens being placed into an operational position along a scene taking axis of the camera and simultaneously positions associated pairs of ranging lenses in operational positions with respect to corresponding ones of flash strobes.

The camera of the above-noted patent provides a close-up camera suitable for a variety of select magnifications. However, variation of other exposure parameters is also desirable, as well as the provision of filter accessories. Hence, it is of some importance to also provide simple and economical control of these factors. Accordingly, it is desired to provide a camera of the above type which controls these features in the desired manner.

SUMMARY OF THE INVENTION

In accordance with the present invention, it is an object to provide an improved camera and optical accessories for use therewith, as well as methods of their use.

In one illustrated embodiment of the present invention, there is provided a camera apparatus which includes housing means and actuating means. The actuating means is operable for initiating an exposure cycle. Provision is made for means for providing a plurality of variable exposure parameters. Included in the exposure parameter providing means is a flash means operable for controlling the amount of flash illumination directed thereby at a scene to be photographed during the exposure cycle in response to a flash firing interval signal thereto so as to provide a selected scene exposure. Provision is made for selecting means being operable for selecting different exposure parameters provided by the exposure parameter means; and, control means including memory means comprising preset flash firing interval values. Each one of the preset values is associated with a particular combination of selected exposure parameters. The memory means is operable in response to the actuating means and the selecting means for providing a flash firing interval signal to the flash means for defining a flash firing interval in accordance with the selected preset value.

In an illustrated embodiment, there is provided at least one of a plurality of filter accessories. Each one of the accessories is adapted for being mounted on the housing means for altering scene exposure during the exposure cycle in accordance with filter transmission characteristics of the mounted filter accessory. There is provided means associated with the housing means for determining which of each one of the filter accessories is mounted on the housing means. Included is memory means being operable for storing preset flash firing interval values defined in accordance with the combination of the exposure parameter values, and the transmission characteristics of a mounted filter accessory.

In another illustrated embodiment, provision is made for an optical accessory for a camera wherein the camera has an exposure lens mounted along a camera exposure axis and at least one strobe means spaced from the exposure lens for illuminating the photographic scene. Included in the accessory there is comprised a lens filter adapted for filtering scene light; at least one strobe filter adapted for filtering flash illumination from the at least one flash means; an elongated accessory body having the lens filter mounted in a first area thereof and the flash filter mounted in a second area thereof. The second area of the accessory body is longitudinally spaced from the first area in accordance with the distance between the exposure lens and the flash means. The accessory body is adapted for mounting on the camera in an operable orientation wherein its first area is located over the exposure lens and its second area is located over the flash means, whereby during an exposure cycle the illumination of the scene by the flash means and the transmission of light from the illuminated scene to a camera are modified in accordance with the filter accessory. Provision is made for means on the body portion which is detectable by a camera detecting means for identifying the type of filters carried by the body means.

In yet another illustrated embodiment, provision is made for the body portion including a pair of longitudinally spaced apart end portions, wherein the body portion and end portions have an inner surface adapted to face towards an outer surface of the camera. Each of the end portions is turned outwardly relative to the body portion to extend about a lateral side edge of the camera; wherein each of the inner surfaces of the end portions carries retaining means thereon for releasably retaining the accessory in a mounted condition on the camera.

In still another illustrated embodiment, provision is made for an accessory of the above type wherein one of the accessory end portions is moveable with respect to the accessory body for facilitating mounting and removal of the accessory. The moveable end portion comprises a lever arm having an inner distal end thereof carrying the retaining means. The lever arm is cantilevered at its center from the accessory body in a manner to bias its inner distal end toward the other accessory side such that the lever arm tends to strobe and hold the accessory to and against the camera.

In yet another embodiment, provision is made for a method of exposing an image recordable material comprising the steps of: providing a camera apparatus operable during an exposure cycle to illuminate a scene with flash illumination in a manner related to subject distance so as to provide a suitable exposure value for the recordable material. The step of providing a camera includes the steps of providing an actuator operable to initiate an exposure cycle; means for providing a plurality of variable exposure parameters wherein one of the variable exposure parameter means is a quenchable flash strobe means. The flash strobe means is operable for controlling the amount of flash illumination directed thereby at a scene to be photographed during the exposure cycle in response to a flash firing interval value signal thereto. The method includes the step of selecting different exposure parameters provided by the variable exposure parameter means. The steps of providing the camera includes providing a control means having memory means comprising preset flash firing interval values, wherein each one of the preset values is associated with a particular combination of selected variable exposure parameters. A flash firing interval signal is generated by the memory means in response to operation of the actuating means and the selecting means, whereby the provided flash firing interval signal defines a flash firing interval in accordance with the selected preset value.

Among the objects of the invention are the provision of: an easily operable close-up camera whose operation is automatically defined in accordance with operator selected parameters; an optical filter accessory which interfaces with the close-up camera to modify operation of the latter in accordance with the filter characteristics of the mounted accessory; a camera having a plurality of selectable exposure parameters and a lookup table programmed to define flash illumination in accordance with the selected exposure parameters; the variable exposure parameters including magnification, exposure trim and flash illumination values which are accommodated by look-up table means having predetermined preset flash firing intervals stored in memory for each different combination of the exposure parameters to thereby define a flash firing interval for the flash in accordance with the selected stored preset interval; and, filter accessories, configured to extend across the camera face, which are provided to modify both the scene light passing to the exposure lens and the illumination from the flash strobes, and the camera includes an arrangement for interfacing with the accessory to automatically modify the camera operation, and includes additional look-up table capacity for selecting a proper flash firing interval which accounts for the selected filter accessory.

Other objects and further scope of applicability of the present invention will become apparent from the detailed description to follow when taken in conjunction with the accompanying drawings wherein like parts are designated by like reference numerals throughout the several views.

BRIEF DESCRIPTION OF THE DRAWINGS

FIG. 7 is a perspective view of a filter sensor board which interfaces with the filter accessories illustrated in FIGS. 5 and 6;

FIG. 8 is a block diagram illustrating electrical operational elements of the camera of FIG. 1.

DETAILED DESCRIPTION

Figure 1:
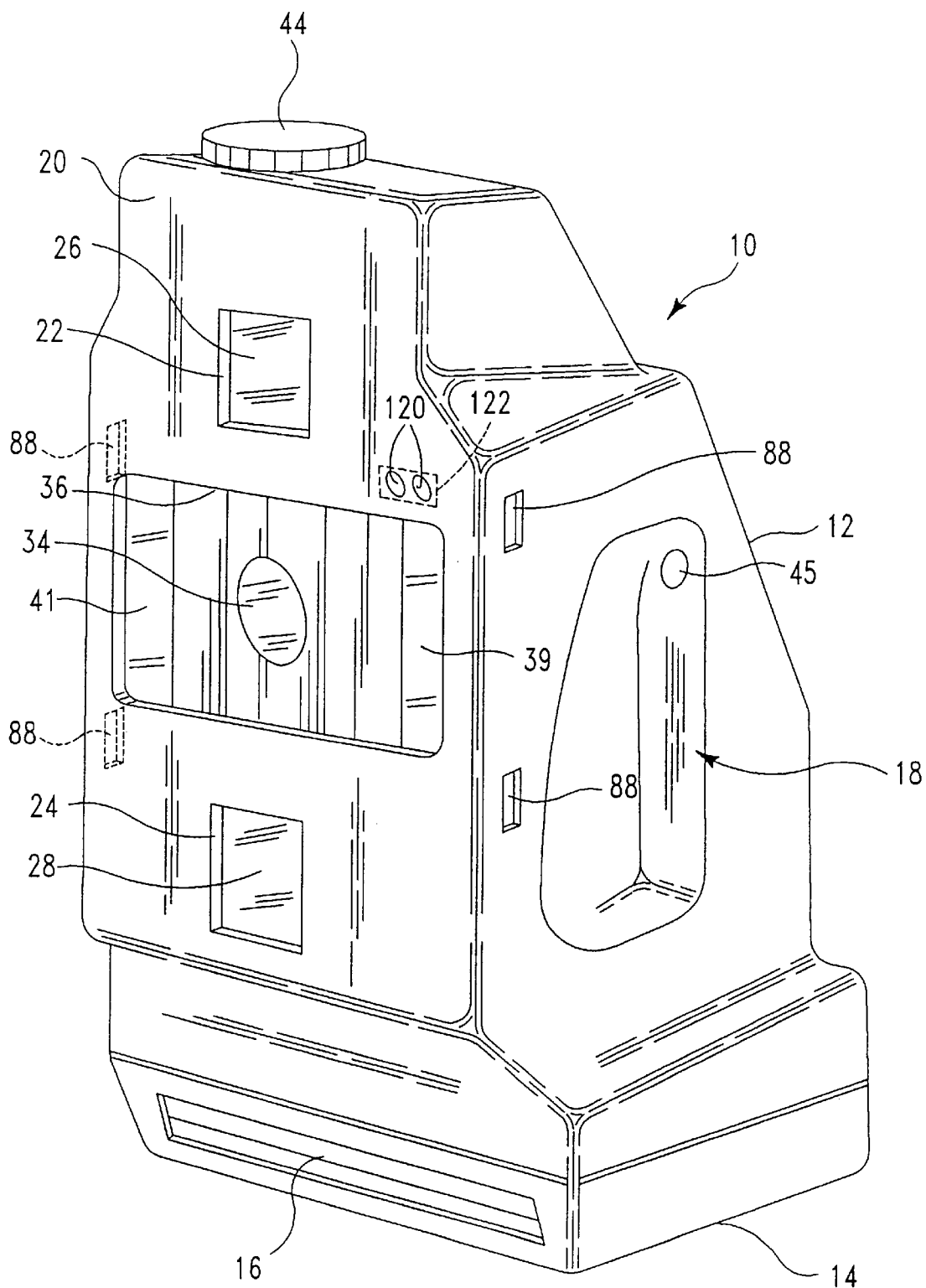
FIG. 1 is a diagrammatic view in perspective of a close-up camera having a plurality of exposure lenses in accordance with a preferred embodiment of the invention.

As illustrated in FIGS. 1 to 4, the present invention includes a close-up camera 10, similar to that set forth in the above-noted U.S. Pat. No. 5,448,323, which as noted is incorporated herein by reference. Accordingly, only those components of the camera described therein which are considered necessary for understanding the present invention will be set forth herein. The camera 10 essentially includes an upper housing 12 and a lower housing 14. The lower housing 14 is configured for receiving a film pack (not shown), preferably carrying film units of the instant developing type. A film exit slot 16 allows for ejection of an exposed film unit therethrough. A pair of hand grips 18 (only one of which is shown) is mounted on the upper housing 12 for facilitating manual support of the camera 10. A front face 20 of the camera carries a pair of vertically spaced apertures 22, 24, each of which accommodates ranging lenses 26, 28; respectively. The ranging lenses 26 and 28 operate to focus appropriate beams of light 30, 32 for ranging of subject distance; as is described in the last noted patent. Centrally located between the apertures 22, 24 is a central opening 36 covered by an appropriate transparent shield. Selectively positionable within the opening 36 is one of a plurality of exposure lenses 34.

Figure 2:
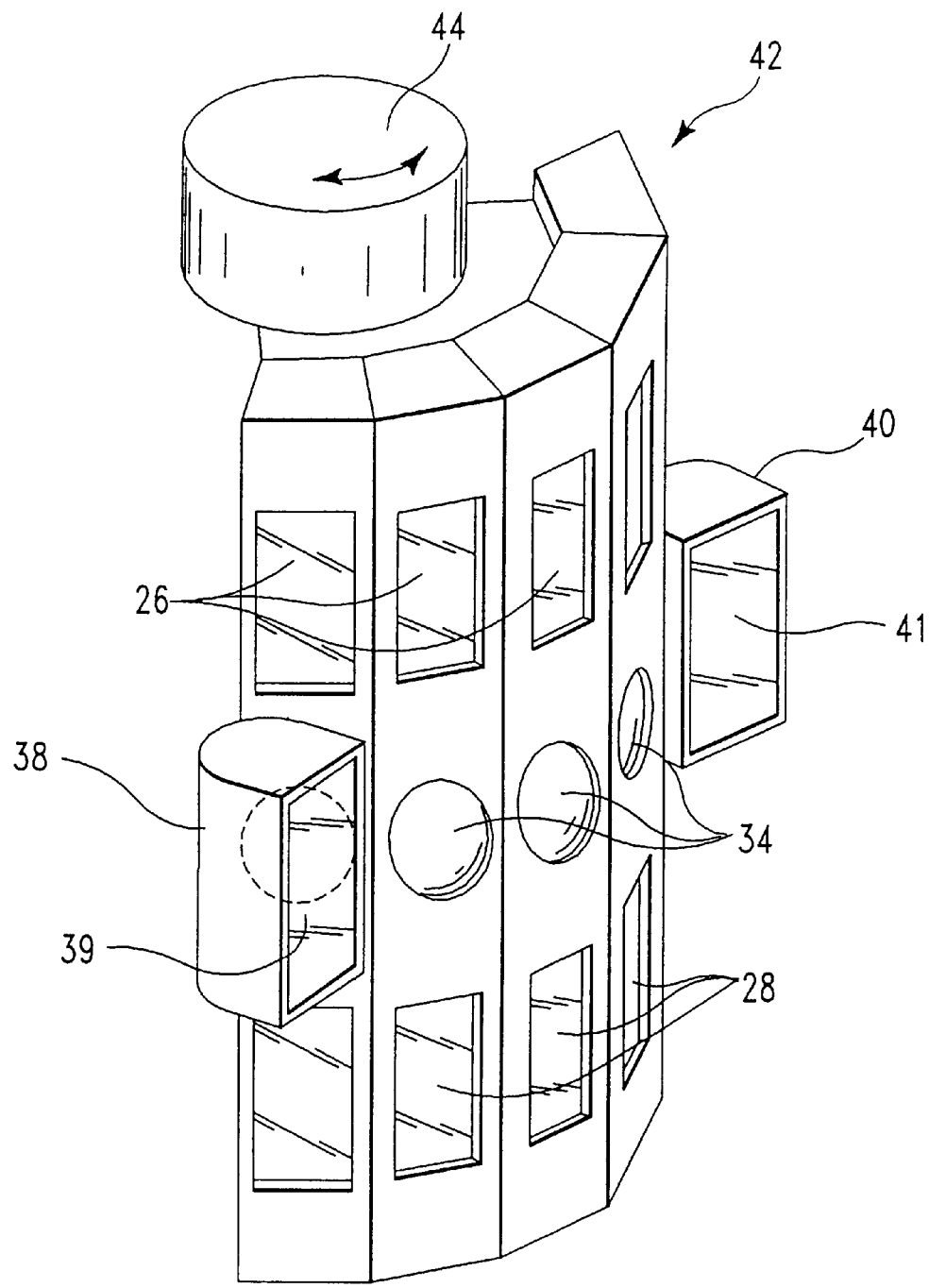
FIG. 2 is a fragmentary view in perspective illustrating the lens turret arrangement of the camera of FIG. 1.
Figure 3:
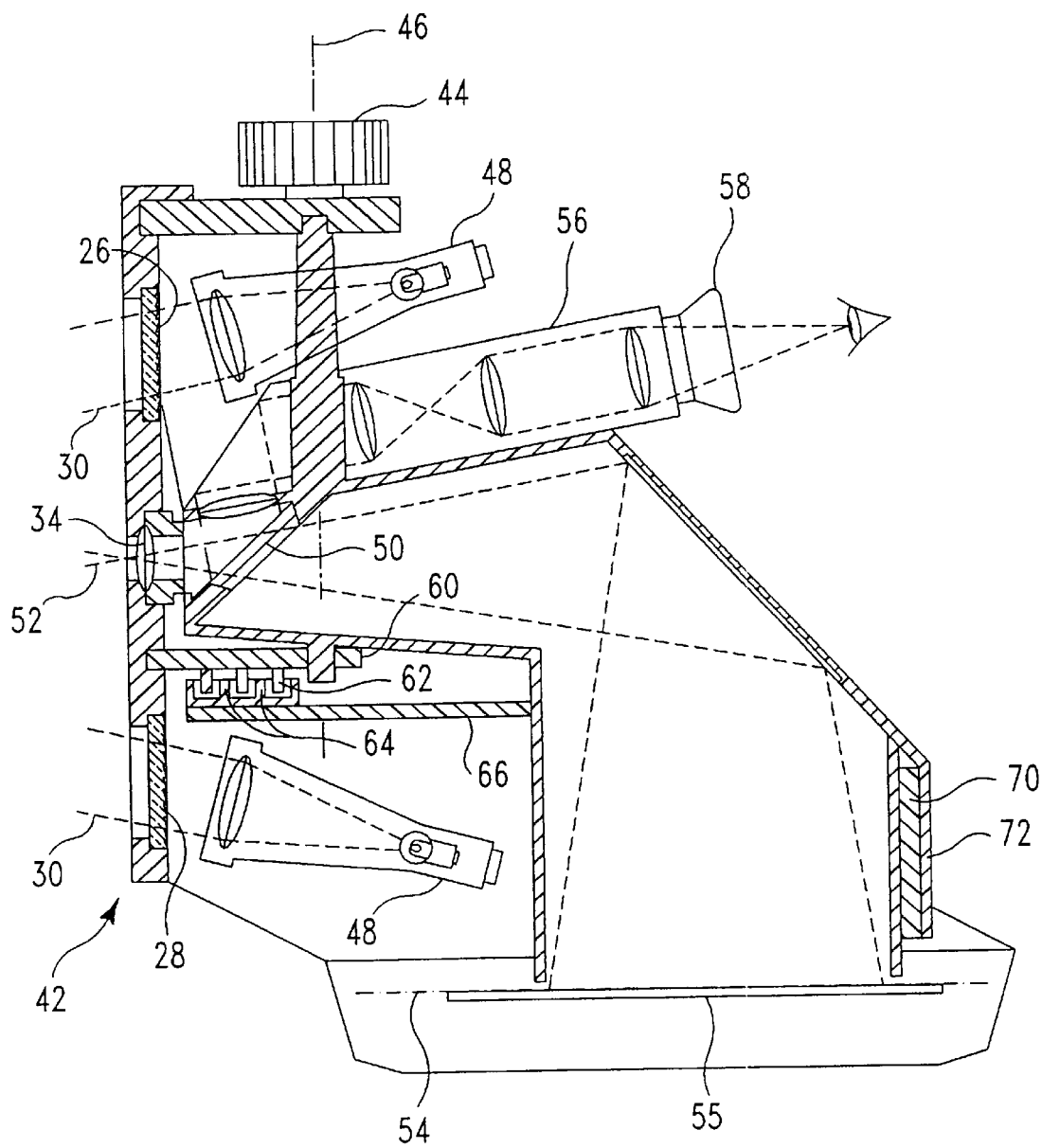
FIG. 3 is a fragmentary view in section of a portion of the camera shown in FIGS. 1 and 2.

For purposes of illuminating the scene, a pair of quenchable strobes 38 and 40, is illustrated in FIGS. 2 and 3. They provide flash means operable for producing pulses of illumination which are directed at the scene. The strobes can include a flash discharge tube wherein a quench signal interrupts the flash discharge tube. Both are fixedly located within the upper housing 12 with their light emitting faces 39 and 41 positioned within the opening 36 and in laterally spaced apart relationship with respect to the exposure lens 34. Additionally, a camera actuator button 45 is positioned in the illustrated hand grip 18. The camera actuating button 45 is actuatable for effecting the commencement of an exposure cycle.

The camera 10 includes a rotatable turret 42 and lens system, shown in more detail in FIGS. 2 and 3, mounted within the upper housing 12 for rotation about a vertical axis 46 of the camera. The turret 42 includes a pair of ranging lenses 26, 28 in association with each of the plurality exposure lenses 34, and an adjusting dial or knob 44. The knob 44 extends from the top of the upper housing 12 to facilitate operator selection of the desired magnifications by rotation of the turret in accordance with positioning of a particular exposure lens 34 behind the opening 36; as well as the corresponding preset pair of ranging lenses. A detent arrangement, not shown is utilized to facilitate positioning of the turret 42 in one of its five magnification positions, and indicia (not shown) is also provided in adjoining relation to the turret knob 44 to visually indicate the selected magnification. In a preferred embodiment, five discrete exposure lenses 34 (three of which are depicted) are utilized to provide five levels of magnification and associated subject distances of 0.2× at 51.7 in., 0.4× at 25.8 in., 1× at 10.2 in., 2× at 5.1 in., and 3× at 3.4 in.

For ranging, a pair of ranging lights 48 are fixedly mounted within the camera 10, each for directing light through a respective one of the pair of ranging lenses 26, 28 in accordance with turret position so as to form the light beams 30, 32 which are used in a manner as is set forth in the aforementioned U.S. Pat. No. 5,448,323.

As also described in the above-noted patent, a shutter arrangement is provided by a mirror 50, mounted in the camera 10 for pivotal motion between a viewing position as seen in FIG. 3, wherein it blocks the exposure path 52 and an exposure position (not shown) wherein it permits passage of scene light along an exposure path to a film plane 54 for exposing a film unit 55, preferably of the instant developing type, presented thereat. Carried behind each exposure lens 34 in the turret 42, is a fixed aperture (not shown) of a size to accommodate the magnification of the lens 34 with which it is associated. Preferably, each exposure lens 34 has the smallest practical aperture for its magnification (ranging from f100 at 300% enlargement to f24 at 20% reduction), so as to guarantee that the focus remains correct over as great a depth of field as possible.

As seen in FIG. 3, the turret 42 at its lower end, carries a horizontal plate 60 from which three fins 62 depend downwardly into the vicinity of three optical sensors 64; the latter being conventional optical beam assemblies constructed to provide an electrical signal when its light beam is interrupted. The optical sensors 64 are mounted on an encoder board 66, such that each of the fins 62 pass through an associated one of the sensors 64 in accordance with turret rotation for effecting an encoding arrangement for turret positioning. In a preferred embodiment, the three sensors 64 are spaced along the encoder board 66 in a front to back row, whereas the fins 62 are both radially and circumferentially spaced from each other on the plate 60 in a manner such that upon turret rotation, each fin will pass through one select sensor during its arcuate path, and a unique fin sensor combination will be provided at each of the five detent positions of the turret 42. While up to eight different positions can be identified by this encoding arrangement, only five are utilized in a preferred embodiment. In any event, the fins 62 in combination with the sensors 64 and encoder board 66 provide means for sensing the position of the turret, or that is the magnification setting of the camera, and while the just described turret sensing is preferred, other arrangements can be utilized.

Extending from the encoder board 66 are three circuit lines (not shown) to a logic board or logic circuit board 70 (later explained in detail in regard to FIG. 8) which is located within the camera 10. The logic circuit board 70 includes a microcontroller which is operable for decoding the signals from the turret encoder in conventional manner to determine the magnification setting. Further, a control panel 72, is operable for allowing an operator to control a variety of exposure parameters, such as flash modes (e.g., single or double flash firings or no flash firings) and trim settings as later explained. The control panel is coupled to the logic circuit board 70 and is positioned on the exterior of the camera 10 so as to be accessible to the operator.

As subsequently explained in more detail, scene illumination is controlled in accordance with the various exposure parameters selected by the operator including the selected magnification (i.e., the exposure lens selected by turret knob), which also defines the proper camera-to-subject distance and the aperture associated with that magnification. To specifically define the correct amount of scene illumination from the strobes 38 and 40, the latter are quenched after a precise firing time determined by the magnification selected, trim selection and flash mode selection, as well as optical accessory selection; as will later be explained hereinafter.

Figure 4:
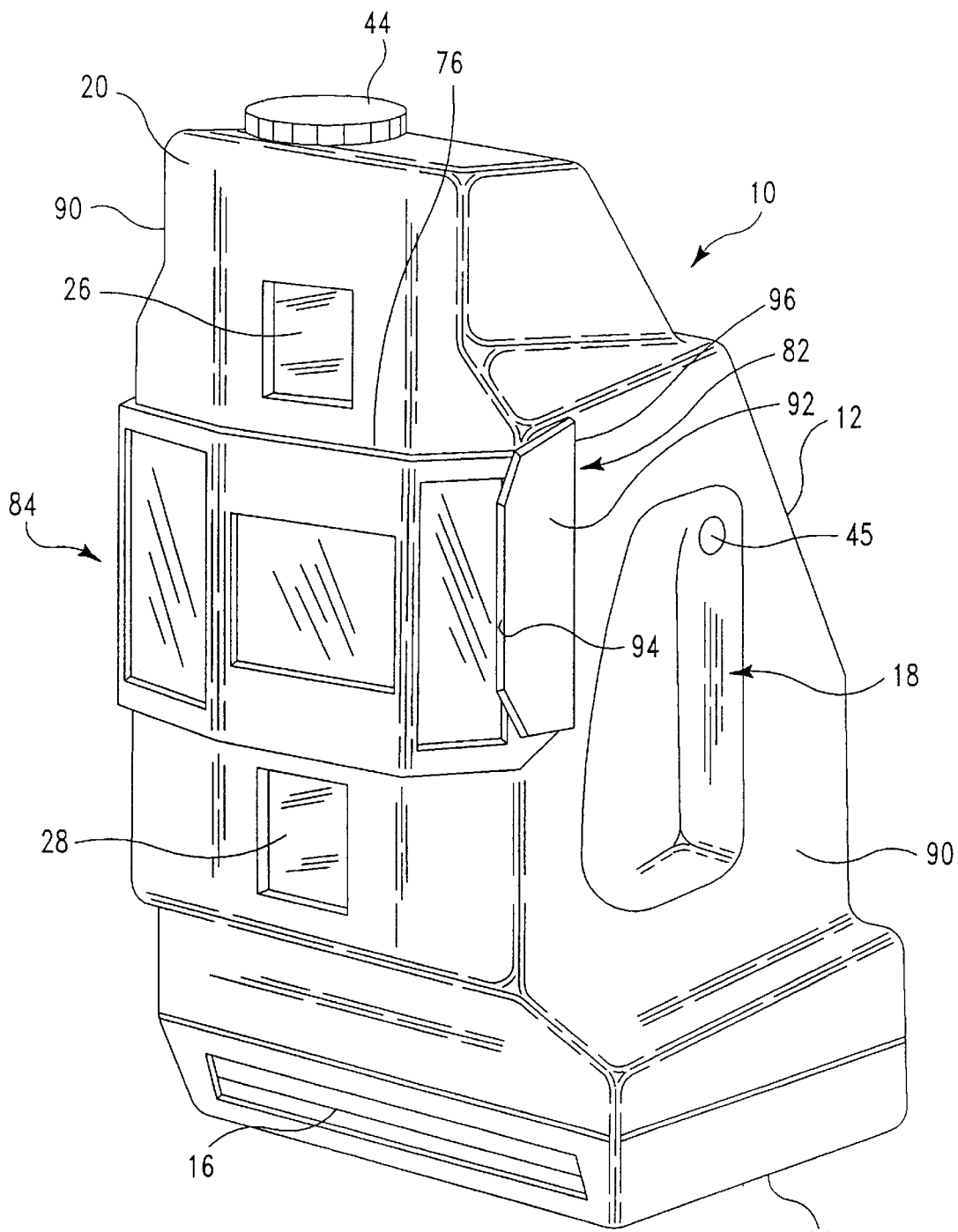
FIG. 4 is a diagrammatic view in perspective of the camera of FIG. 1 illustrating its combination with a filter accessory.
Figure 5:
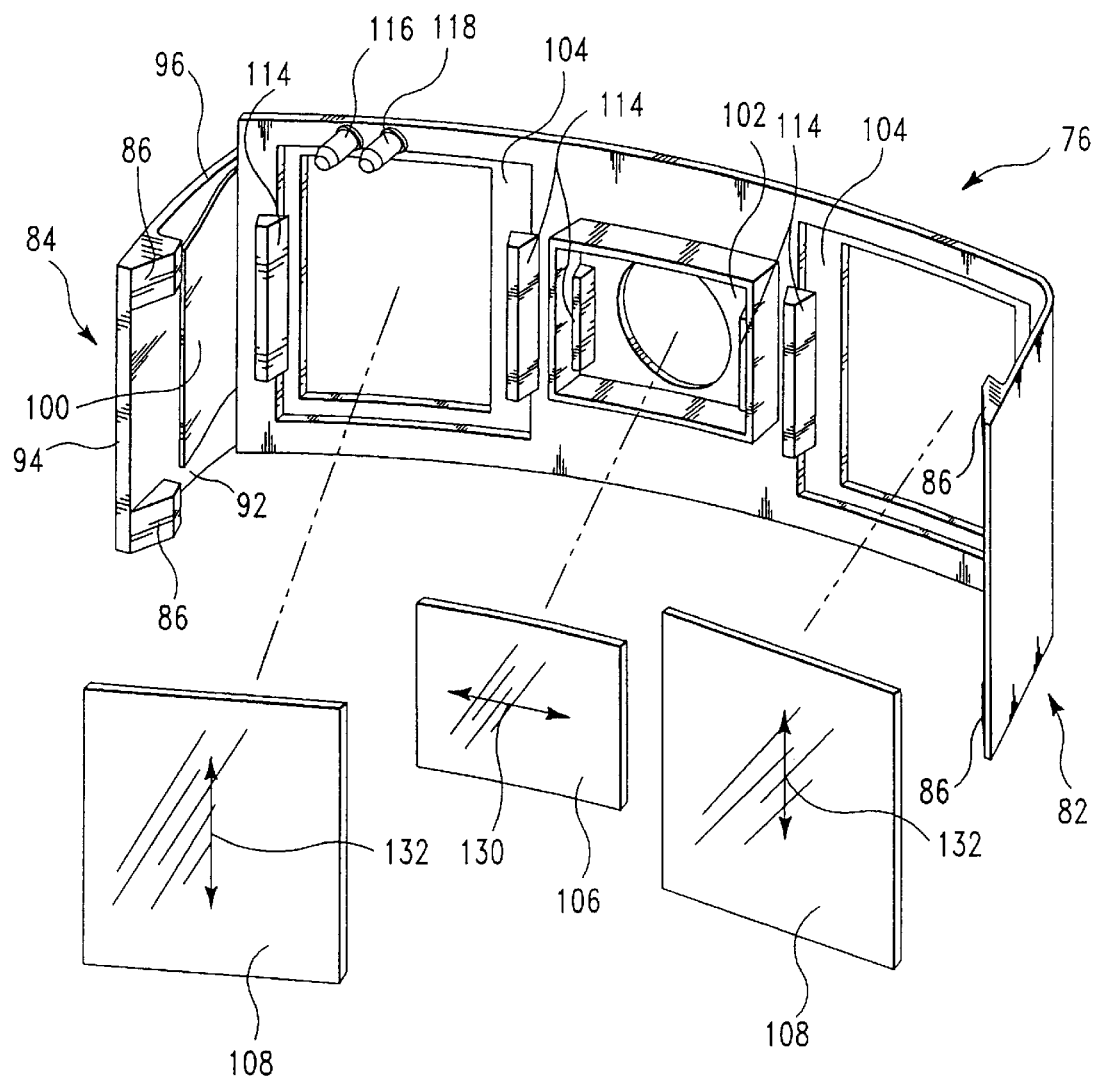
FIG. 5 is an exploded view in perspective of an accessory as illustrated in FIG. 4.
Figure 6:
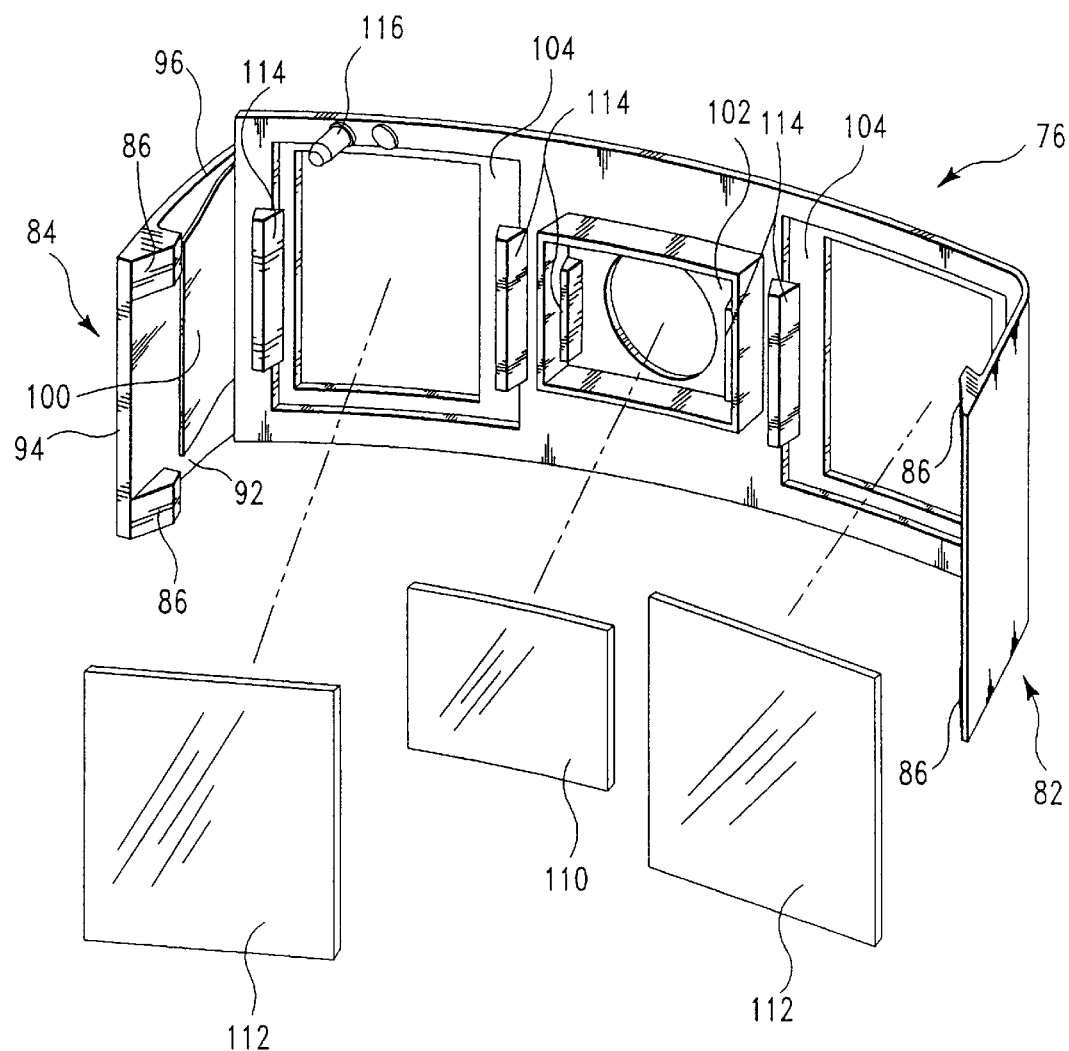
FIG. 6 is an exploded view in perspective of another filter accessory provided in accordance with the invention.

The camera 10 is constructed to accept at least two different types of optical filter accessories which, in the present embodiment, are a polarizing filter accessory 76, shown in FIG. 5, and a flourescein filter accessory 78 illustrated in FIG. 6. These filter accessories 76 and 78 employ substantially identical, elongated body members 80 of plastic material, such as diamond polymer ABS 3500 or similar material. Each body member has its lateral longitudinal ends turned rearwardly, as viewed in the drawings, to form lateral sides 82 and 84, constructed to snap-fit to the camera 10 as shown in FIG. 4. To accommodate this snap-fit mounting, the sides 82 and 84 each carry a pair of vertically spaced, inwardly facing protrusions or projections 86 arranged to be received by a generally complementary pair of vertically spaced notches, or indents 88, located on the sides 90 of the upper housing 12; as shown in FIG. 4. Hence, it should be understood that the projections 86 and the corresponding indents 88 provide tactile discontinuities or releasable retaining structure configured for releasably retaining the accessories 76 and 78 on the camera 10.

Mounting and demounting of the accessories 76 and 78 to the camera 10 is facilitated by forming the side 84 as a hinged or moveable side assembly having an elongated lever 92 with its inner distal end 94 carrying the projections 86, and its outer distal end 96 (FIG. 4) extending slightly forwardly of the body member 80. The lever 92 is connected to the body member 80 by means of a resiliently flexible spring or hinge section or member 100, joined to the lever to allow it to pivot around the hinge section. The plastic material of the body 80 is employed as a spring material to form the hinge section 100. Advantageously, the hinge section 100 is also configured to slightly cant the inner distal end 94 of the lever 92 toward the body member 80 to bias this end towards the side 90 and thus, strobe the projections 86 within the camera indents 88 when the accessory is mounted on the camera 10. To facilitate mounting and demounting of the accessories 76 and 78 to the camera 10, the camera operator pushes the outer distal end 96 of the lever 92 toward the body member 80, which, in turn, drives the inner distal end 94 (and its projections 86) laterally away from the facing side 82 to thereby open the side 84 so as to fit about the camera face 20. Advantageously, the elongated lever 92 and the cantilevered arrangement by the hinge section 100 provides mechanical advantage for this operation. It should be understood that the hinged assembly, and its lever member 92 provides a moveable portion allowing opening of one side 84 of the accessory, which side is also biased toward the accessory and thus toward engagement with the camera.

As indicated previously, both filter accessories 76 and 78 employ essentially the same body member 80 which, as shown in FIG. 4, is configured to extend across the camera face 20 over both the exposure lens 34 and the flash strobes 38 and 40. The body member 80 carries a centrally located opening 102 and two laterally spaced openings 104, both of which are stepped as shown 103 and 105 to receive appropriate filters. For the polarizing filter accessory 76, an exposure filter 106 and a pair of illumination filters 108 are fitted to the openings 102 and 104, and in the case of the fluorescein filter accessory 78, an exposure filter 110 and a pair of illumination filters 112 are fitted to these openings such that flash illumination and exposure light will be modified by the filter accessory employed. To retain these filters 106 to 112 in place within the stepped openings 102 and 104, the body member 80 include a pair of retainer elements, or lips 114 located along two opposed edges of these openings in a manner to partly overhang the edges of these openings. In this arrangement, the filters are deformed slightly and snapped in place beneath the lips 114. Additionally, since commercially available, thin gelatin filters of low stiffness are preferably employed as the filters 106 to 112, rectangular washer (not shown) of spring metal are also deflected into place behind the filters 102–106 and under the lips 114 in a conventional manner to hold these filters in place. Of course, the latter washers can be dispensed with when the filters utilized are of sufficient stiffness as to be self-contained beneath the lips 114.

Prior to individually describing each filter accessories 76 and 78, other common aspects of these accessories will be described. As shown in FIGS. 5 and 6, the elongated body member 80 is slightly curved longitudinally in keeping with the slightly curved camera face 20 so that the filters 106 to 112 of the accessories 76, 78 are positioned close to the exposure lens 34 and the light emitting faces 39 and 41 of the strobes 38, 40.

Further, since more than one filter accessory is provided, and since camera operation must be altered to accommodate the filter arrangement, provision is made to automatically modify the camera cycle when a filter accessory is in place. To this end, the body member 80 is constructed with a pair of probe pins or posts 116 and 118, which extend inwardly or rearwardly from the body member 80 and are adapted to enter appropriate and corresponding openings 120; respectively, located in the camera face 20, see FIG. 1. The probe pins will activate sensors, such as microswitches 124 or 126 of a filter sensor board 122 (shown in FIGS. 1 and 7). Thus, by means of the signals from the activated ones of microswitches 124, 126, the logic circuit board 70 identifies the attached filter accessory and which look-up table will be selected as is noted below.

Reference is made back to FIG. 5, for illustrating the polarizing filter accessory 76. This accessory 76 is constructed for photographic use of the camera with polarized strobe light, and employs crossed polarizer filters. In a preferred embodiment, the polarizer filters of accessory 76 are fully crossed such that essentially only non-spectral reflections reach a film unit 55 at the exposure plane. Hence, the filters 106 and 108 are constructed of plane polarized material, with the exposure filter 106 having its polarizing axis 130 mounted normal to the polarizing axes 132 of the illuminating filters 108 to thereby provide ninety degree crossed polarizer filters. The polarized light from the strobes 38 and 40, which is reflected directly back to the camera is blocked by the exposure filter 106 in a conventional manner and thus, does not enter the camera 10. Only light that comes back at different angles will pass to the film. Hence, sharp specular reflections are eliminated thereby eliminating unwanted hot spots in the image. However, this results in a loss of about 2⅓ stops.

The crossed polarizer filters can be other than 90 degrees, and for example, may be as low as 30 degrees for controlled reflections. However, any such variation in the amount of crossed polarization requires different programming of the camera to provide an appropriate variation in flash duration.

The fluorescein filter accessory 78 is constructed, on the other hand, for photographic use with a flourescein dye, such as is commonly used for examination of scratched or cracked surfaces of for instance the human eye. The flourescein dye, when placed on the eye surface, accumulates in any crevices, and upon illuminating such surface with blue light, the dye flouresces with its characteristic yellow light to thereby highlight the crevice. Consequently, the flourescein filter accessory 78 employs a pair of illumination filters 112 which transmit only blue light to the scene and an exposure filter 110 which transmits only yellow light to the camera 10. Thus, only blue light from the strobes 38 and 40 reaches the subject, such that the fluorescein dye then fluoresces yellow. The yellow light is transmitted, in turn, through the exposure filter 110 to the film plane 54, which is a yellow filter used to absorb blue light so that you can see the flourescing yellow dyes. With this accessory 78, however, the light loss is about 4 or 5 stops, and thus, the camera 10 is limited to 3× magnification for this accessory.

As previously indicated, the camera 10 includes a filter sensor board 122 having microswitches 124, 126 for interfacing with the probe posts 116 or 118 as provided. Preferably, body members 80 are identically formed, and one of the posts, such as post 118 is either retained or broken away, depending upon whether or not the polarizing filters 106 and 108, or the fluorescein filters 110 and 112 are assembled in that body member. Hence, both posts 116, 118 or one post 116 can interface with the switches 124, 126 of the filter sensor board 122 to enable the camera 10 to determine the type of filter accessory in place. The accessory board 122 will operate with the logic circuit board to subsequently alter the camera's operation in accordance with the selected accessory; as will be set forth. As shown in FIG. 5, the polarizing filter accessory 76 carries both probe posts 116 and 118, whereas the fluorescein filter accessory 78, as shown in FIG. 6 retains only the post 116, it being understood that post 118 has been removed, for example, cut, or broken off). Hence, in a preferred embodiment, the accessory 76 activates both microswitches 124, 126, and the accessory 78 activates only the microswitch 126 in the filter sensor board 122. Accordingly, the quench times for operation of the strobes are recalibrated in accordance with the presence or absence of the filters and which type of filter.

Figure 9:
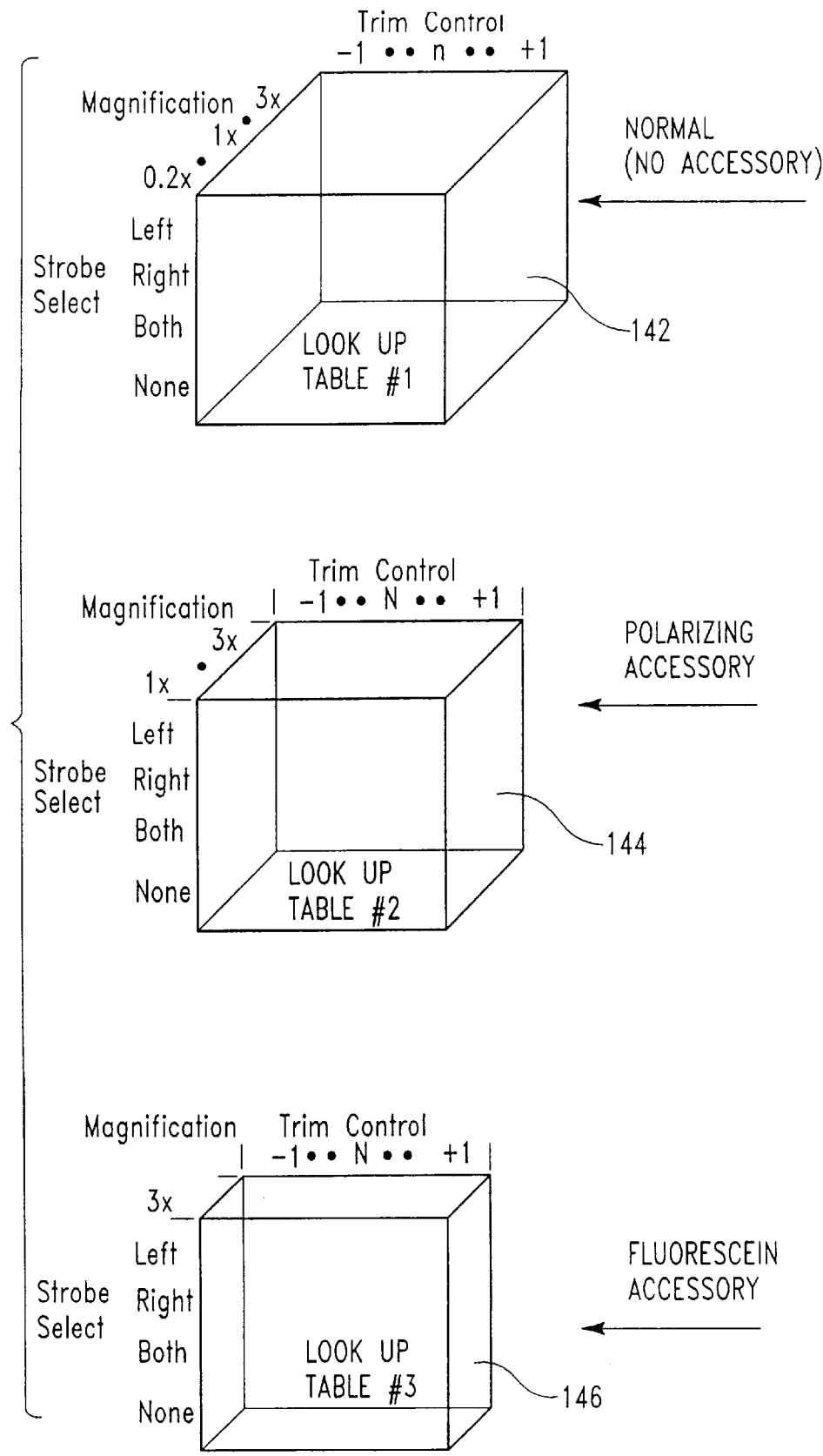
FIG. 9 is a perspective view diagrammatically illustrating the plurality of look-up tables of FIG. 8.

The overall operation of the camera 10 will be now explained with particular reference to FIGS. 8 and 9. Turning first to FIG. 8, the control panel 72 is shown to include manually operable switches, for example, membrane switches, such as an off/on switch 134, a flash mode select 136 and a trim control 138, all being connected to the logic circuit board 70. In a preferred embodiment, the logic circuit board 70 is a micro controller circuit which receives the electrical signals from the camera elements and, in turn, controls the camera cycle including the firing of the flash strobes in accordance with variable exposure control parameters which have been selected. Consequently the logic circuit board 70 includes a conventional, electronically erasable memory section, at least a portion of which is separately illustrated in dotted outline at 140, to include three look-up tables, namely a look-up table #1 designated as 142, a look-up table #2 designated as 144 and a look-up table #3 designated as 146. These look-up tables 142, 144 and 146 are also illustrated for clarity in three dimensional form in FIG. 9. In an illustrated embodiment, the microcontroller has non-volatile memory, wherein the look-up tables reside in the form of a three dimensional array. While the foregoing memory arrangement is selected, it will be appreciated that other memory systems are contemplated.

As diagrammatically illustrated in FIG. 9, the look-up tables 142, 144 and 146 employ combinations of the exposure parameters, such as magnification (which is a function of the exposure lens which is selected), flash mode selection, and trim setting to define the desired memory cell addresses which defines each preset flash firing exposure value. Each cell stores a correct preset flash firing interval for each and every different combination of the parameters which are selected. Thus, the look-up table 142 is provided for a normal (no accessory) cycle, and the magnification ranges from 2× to 3×, the trim between plus or minus one stop, and the flash modes range from neither strobe operable to left or right strobe being operable, as shown. The exposure cycle is modified in accordance with the type of accessory employed. For the polarizer accessory 76, the look-up table 144 is utilized, and thus, the magnification can range from 1× to 3×. For the fluorescein accessory 78, the table 146 is utilized, and the magnification can be 3×. It will be appreciated that the present invention utilizes a variety look-up tables values, wherein each preset flash firing interval or quench signal is selected to give a desired exposure in accordance with which of the variable exposure parameter values are used and selected. Accordingly, the values expressed above are for purposes of illustration and not limitation and can be set to fulfill desired some of the exposures.

As illustrated in FIG. 8, the camera actuator 45 for commencing a camera cycle and the turret encoder 66 are connected to the logic circuit board 70, as well as the filter sensor board 122; the latter signaling the logic circuit board 70 when an accessory is in place on the camera 10, and which accessory is so mounted. The logic circuit board 70 also, in turn, controls a strobe fire control circuit 150 to separately fire and quench the right strobe 38 and the left strobe 40. The flash fire control 150 includes a conventional strobe board for storing the required strobe charge and conventional trigger boards (also not shown) for each strobe to separately turn the strobes on and off in accordance with appropriate signals.

As noted previously, the turret encoder 66 signals the logic circuit board 70 as to turret position, which defines the magnification and consequently the correct subject to camera distance. The magnification, is one of the exposure parameters which determines the particular address for the look-up tables, 142, 144, and 146, as later explained with regard to FIG. 9.

The actuator 45 is a two stage manual switch, which in its first stage, signals the logic circuit board 70 to awaken the camera 10 and turn on the ranging lights. In its second stage, actuator 45 signals the logic circuit board 70 to operate the camera 10 through an exposure cycle. Thus, the actuator 45 is operable to initiate an exposure cycle, then after a short period of inactivity, the logic circuit board 70 automatically shuts the camera down. On the other hand, the off/on switch 134 of the control panel 72 simply signals the logic circuit board 70 to wake the camera 10 (along with its ranging lights), or to shut the camera down.

As seen in FIGS. 1 and 2, the strobes 38 and 40 are located on either side of the exposure axis, such that by separately operating one or the other, the operator can shadow either side of the scene in accordance with desired scene lighting. By means of the look-up tables 140, 142 and 144, the logic circuit board 70 automatically compensates for the loss of flash illumination under these conditions, as later explained in more detail, by driving the operating strobe for a longer firing interval thereby maintaining a suitable exposure value.

The flash select switch assembly 136 of the control panel 72 comprises a toggle switch circuit which can be manually stepped through different selections to appropriately signal the logic circuit board 70 for firing of both strobes, neither strobe, the left strobe only, or the right strobe only. Consequently, the flash select switch assembly 136 provides means for selecting different strobe modes of operation. Preferably, indicia (not shown) is provided for indicating the flash select condition of the camera 10.

The trim control switch assembly 138 allows the camera operator to lighten or darken the photograph (about up to plus or minus one stop) so as to enhance specific details in the recorded image. In this regard, the trim control switch assembly 138 signals the logic circuit board 70 in a conventional manner to identify a desired trim setting, and the latter circuit controls the camera for that trim exposure setting. Taken together, the turret 42 with its encoder 66 and the control panel 72 provide means operable for selecting various exposure parameters for the subsequent exposure cycle, and means for signaling these selections to the logic circuit board 70.

In accordance with the signal from the actuator 45, the logic circuit board 70 defines the operation of the exposure system for each selected exposure parameter including magnification, flash illumination, and trim control as well as consideration of a filter accessory, if any. Then it activates the shutter arrangement (shown in FIG. 3 as the mirror 50) to operate the camera 10 through an exposure cycle. Thus, the logic circuit board 70 evaluates the turret encoder signal which is indicative of the exposure lens in position and hence the magnification which is being employed, the flash mode select signal which indicates which if any of the strobes are to be used for a given exposure and the trim setting signal in any and in accordance therewith, automatically fires the strobes 38 and 40 in accordance with a preset flash fire interval signal that is correlated to the particular combination of exposure control parameters which are selected. The flash fire interval signal is quenching signal which controls the duration of the illumination provided by the strobes to define an illumination interval providing a correct exposure for the selected parameters.

For instance, in a camera exposure cycle where no filter accessory is being used and consequently where no signal is received from filter sensor board 122, the logic circuit board 70 applies the selected parameter signals (e.g., indicative of the selected exposure lens, the selected exposure trim and flash mode selection) to find preset flash fire interval signal or quench signal associated with a discrete address of the memory cell in look-up table 142. The flash firing interval signal is for the particular combination of selected exposure parameters identified by those signals. That stored interval is then read and utilized by the logic circuit board 70 to define an appropriate firing interval for the strobes 38, 40. That is, the logic circuit board 70, first signals the strobe fire control 150 to fire the strobes in the selected mode, and then after the lapse of an appropriate time substantially equal to the stored interval, delivers a quench signal to the strobe fire control circuit to cause the latter to quench the selected strobes in a time interval which will provide for desired exposure.

This sequence of operation for selecting the quench times is also followed when the accessories 76 and 78 are employed, except that the appropriate look-up tables 144, 146 are utilized. When the logic circuit board 70 receives a signal from the filter sensor board 122, indicating that the accessory 76 is mounted on the camera 10, the logic circuit board 70 searches the look-up table 144 (rather than the look-up table 142) for the stored time interval to apply to the flash fire control 150. On the other hand, when the filter sensor board 122 signals that the accessory 78 is mounted, the logic circuit board 70 applies the stored flash fire interval from the look-up table 144 to define the flash firing.

Hence, the logic circuit board 70 has a given flash firing interval stored in memory for each combination of the exposure parameters, and accessories, and provides a quench signal to the flash firing circuit to define a firing interval for the one or more operating strobes in accordance with the stored firing interval for those exposure parameters which have been selected.

As one of the last steps in manufacturing, each camera undergoes a programming test which evaluates operation of that particular camera and stores appropriate values therefor in its look-up tables 142, 144 and 146. Thus, the values stored in each camera are custom constructed in accordance with any slight alterations in manufacturing. Furthermore, each camera may be later reprogrammed, for example, for a different accessory, if needed.

This completes the description of the preferred embodiments of the invention. Since changes may be made in the above structure and process without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. A camera apparatus comprising:

housing means;

actuating means operable for initiating an exposure cycle;

means for providing a plurality of variable exposure parameters; said exposure parameter providing means includes flash means operable for controlling the amount of flash illumination directed thereby at a scene to be photographed during the exposure cycle in response to a flash firing interval signal thereto so as to provide a selected scene exposure;

selecting means operable by an operator for selecting different exposure parameters provided by said providing means;

control means including memory means comprising preset flash firing interval values, wherein each one of said preset values is associated with a particular combination of selected exposure parameters, said memory means is operable in response to said actuating means and said selecting means for providing a flash firing interval signal to said flash means for defining a flash firing interval in accordance with the selected preset value; and at least one of a plurality of filter accessories, each one of said accessories is adapted for being mounted on said housing means for altering scene exposure during the exposure cycle in accordance with filter transmission characteristics of the mounted filter accessory; means associated with said housing means for determining which of each one of said filter accessories is mounted on said housing means; and said memory means storing preset flash firing interval values defined in accordance with the combination of the exposure parameter values, and the transmission characteristics of a mounted filter accessory; wherein the accessories have at least a pair of filters, one of which is placed over an exposure lens and another is placed over the flash means.

2. The apparatus of claim 1 wherein said flash means includes a pair of spaced apart strobes; and said selecting means is operable for selecting different modes of strobe operation for said strobes, wherein said modes of operation include independent or combined operation of said strobes.

3. A camera apparatus operable during an exposure cycle to illuminate a scene with flash illumination in a manner related to subject distance so as to provide a suitable exposure value, said camera apparatus comprising:

a) an actuator operable to initiate an exposure cycle;

b) means for providing a plurality of variable exposure parameters;

c) one of said variable exposure parameter means includes quenchable flash strobe means being operable for controlling the amount of flash illumination directed thereby at a scene to be photographed during the exposure cycle in response to a flash firing interval value signal thereto, said flash means being operable in different modes of operation;

d) a plurality of exposure lenses, each of which is selectively positionable into operative relationship with respect to a camera exposure axis to produce a given magnification;

e) selecting means operable for selecting different exposure parameters provided by the variable exposure parameter means and for providing different magnifications in accordance with the selected one of said lenses, and a selected one of said different strobe modes of operation; and, f) control means including memory means comprising preset flash firing interval values, wherein each one of said preset values is associated with a particular combination of selected variable exposure parameters, selected magnifications and different strobe modes, said memory means is operable in response to said actuating means and said selecting means for providing a flash firing interval signal to said flash means for defining a flash firing interval in accordance with the selected preset value;

g) further including at least one of a plurality of filter accessories, each one of said accessories is adapted for being mounted on said camera for altering scene exposure during the exposure cycle in accordance with filter transmission characteristics of the mounted filter accessory; means for determining which of each one of said filter accessories is mounted on said camera; and, said memory means storing preset flash firing interval values defined in accordance with the preselect value which value is a combination of the exposure parameter values, and the transmission characteristics of a mounted filter accessory, the selected magnifications and the strobe modes; and, f) wherein the accessory comprises a lens filter adapted for filtering scene light over an exposure lens and at least one filter for filtering flash illumination.

4. The apparatus of claim 3 wherein said variable exposure parameter means is also operable for defining a plurality of trim settings for modifying exposure parameters, said selecting means being operable for selecting one of said trim settings; said memory means is operable for storing flash firing interval values defined in accordance with the preselected value which value is a combination of selected magnification, strobe mode, trim setting and transmission characteristics of a mounted accessory; said preselected value is representative of a quench signal which controls the illumination of the scene by said flash means.

5. The apparatus of claim 4 wherein said determining means includes at least one opening in a surface thereof, and an accessory determining circuit means connected to said memory means which determining circuit means includes switch means in operative relationship with said at least one opening, and said filter accessory carrying encoder projection means adapted for selectively cooperating with said opening and said switch means when said accessory is mounted in a manner such that said determining circuit determines which type of accessory is mounted by determining which of said switch means is actuated or not by said encoder projection means; whereby said determining circuit means then indicates to said memory means which of said accessories is mounted.

6. The apparatus of claim 3 wherein said accessory includes an elongated accessory body including a pair of laterally spaced apart end portions which has an inner surface adapted to face towards an outer surface of the camera; each of said end portions is turned outwardly relative to said body portion to form corresponding accessory sides, each of which is adapted to extend about a lateral side edge of the camera; wherein inner surfaces of said end portions carry retaining means thereon for releasably retaining said accessory in a mounted condition.

7. The apparatus of claim 6 wherein one of said accessory end portions is moveable with respect to said accessory body for facilitating mounting and removal of said accessory; said moveable end portion comprises a lever arm having an inner distal end thereof carrying said retaining means, said lever arm being cantilevered at an intermediate area in a manner to bias said inner distal end toward the other accessory side such that said lever arm tends to hold said accessory to and against the camera.

8. An optical accessory for a camera, the camera having an exposure lens mounted on the camera exposure axis and at least one strobe means spaced from said exposure lens for illuminating the photographic scene, said accessory comprising:
   a) a lens filter adapted for filtering scene light;
   b) at least one strobe filter adapted for filtering flash illumination from said at least one flash means;
   c) an elongated accessory body having said lens filter mounted in a first area thereof and said flash filter mounted in a second area thereof, said second area of said accessory body being longitudinally spaced from said first area in accordance with the distance between said exposure lens and said at least one flash means, and said accessory body being adapted for mounting on said camera in an operable orientation wherein said first area is located over said exposure lens and said second area is located over said at least one flash means, whereby during an exposure cycle the illumination of the scene by said at least flash means and the transmission of light from the illuminated scene to the camera are modified in accordance with said filter accessory; and,
   d) means on said body portion being detectable by a camera detecting means for identifying the type of filters carried by said body means; wherein said body portion includes a pair of longitudinally spaced apart end portions, wherein said body portion and end portions have an inner surface adapted to face towards an outer surface of the camera; each of said end portions is turned outwardly relative to said body portion to extend about a lateral side edge of the camera; wherein each of said inner surfaces of said end portions and carries retaining means thereon for releasably retaining said accessory in mounted condition on the camera; wherein at least one of said accessory end portions is moveable with respect to said accessory body for facilitating mounting and removal of said accessory; said moveable end portion comprises a lever arm having an inner distal end thereof carrying said retaining means, said lever arm being cantilevered at its center from said accessory body in a manner to bias said inner distal end toward the other accessory side such that said lever arm tends to hold said accessory to and against the camera.

9. The accessory of claim 8 wherein said lever arm is hingedly affixed to said body so that urging of the other distal end of said lever arm toward the accessory body urges the inner distal of said lever arm away the facing side of said accessory body thereby opening the accessory sides so as to facilitate mounting and demounting of the accessory to and from the camera; and, said hinge section being made of a resilient material.

10. A camera apparatus operable during a camera cycle to illuminate a photographic scene with flash illumination in a follow focus arrangement related to subject distance so as to provide a suitable exposure value during the camera cycle, said camera apparatus comprising:
   a) an exposure lens positioned on an exposure axis of the camera to provide a photograph of a scene during an exposure cycle;
   b) an actuator operable to initiate a camera exposure cycle;
   c) at least a pair of quenchable strobes operable for illuminating a scene during an exposure cycle;
   d) a flash firing circuit including a quench circuit operable to quench said strobes responsive to a quench signal;
   e) means operable for selecting different exposure parameters including different modes of operation of said strobes to illuminate the scene; and
   f) control means including logic circuit board mean for providing said quench signal to said flash firing circuit, said logic circuit board means including a first look-up table having a given flash firing interval stored in memory for each of said different modes of flash operation, and said logic circuit board means providing a quench signal to said flash firing circuit to define a firing interval for said strobes in accordance with selected exposure parameters and the stored firing interval for the selected mode of strobe operation;
   g) a plurality of fixed focus exposure lenses selectively positionable on the camera exposure axis to produce one of plurality of given camera magnifications in accordance with lens selection, and wherein said first look-up table includes stored flash firing intervals defined in accordance with each of said magnifications and the strobe modes, and said logic circuit board means providing a quench signal to said flash firing circuit to define a firing interval for said strobes in accordance with the stored firing interval for the selected magnification and strobe model; and,
   h) different types of filter accessories adapted for mounting on said camera fir altering scene exposure in accordance with filter transmission by a selected filter accessory, and said logic circuit board means including additional look-up table memory having stored flash firing intervals defined in accordance with the combination if each if said strobe modes and the use if a select accessory.

11. The apparatus of claim 10 wherein said means for selecting different exposure parameters includes means for selecting a trim setting for modifying the exposure value of the camera, said first look-up table includes stored flash firing intervals defined in accordance with combinations of each selected magnification, strobe mode and trim setting, and said logic circuit board providing a quench signal to said flash firing circuit to define a firing interval for said strobes in accordance with the stored firing interval for the combination of the selected magnification, strobe mode and trim setting.

12. A camera apparatus operable during an exposure cycle to illuminate a scene with flash illumination in a manner related to subject distance so as to provide a suitable exposure value, said camera apparat us comprising:
   a) an actuator operable to initiate an exposure cycle;
   b) means for providing a plurality of variable exposure parameters;
   c) one of said variable exposure parameter means includes quenchable flash strobe means being operable for controlling the amount of flash illumination directed thereby at a scene to be photographed during the exposure cycle in response to a flash firing interval value signal therto, said flash means being operable in different modes of operation;

d) a plurality of exposure lenses, each of which is selectively positionable into operative relationship with respect to a camera exposure axis to produce a given magnification;

e) selecting means operable for selecting different exposure parameters provided by the variable exposure parameter means and for providing different magnifications in accordance with the selected one of said lenses, and a selected one of said different strobe modes of operation;

f) control means including memory means comprising preset flash firing interval values, wherein each one of said preset values is associated with a particular combination of selected variable exposure parameters, selected magnifications and different strobe modes, said memory means is operable in response to said actuating means and said selecting means for providing a flash firing interval signal to said flash means for defining a flash firing interval in accordance with the selected preset value;

g) further including at least one of a plurality of filter accessories, each one of said accessories is adapted for being mounted on said camera for altering scene exposure during the exposure cycle in accordance with filter transmission characteristics of the mounted filter accessory; means for determining which of each one of said filter accessories is mounted on said camera; and, said memory means storing preset flash firing interval values defined in accordance with the preseleted value which value is a combination of the exposure parameter values, and the transmission characteristcs of a mounted filter accessory, the selected magnifications and the strobe modes; and, h) said accessory comprises: a lens filter adapted for filtering scene light; at least one strobe filter adapted for filtering flash illumination from said flash means; an elongated accessory body having said lens filter mounted in a first area thereof and said strobe filter mounted in a second area thereof, said second area of said accessory body being longitudinally spaced from said first area in accordance with the distance between said exposure lens and said at least one flash means, and said accessory body being adapted for mounting on said camera in an operable orientation wherein said first area is located over the selected one of said exposure lenses and said second area is located over said flash means, whereby during an exposure cycle the illumination of the scene by said flash means and the transmission of light from the illuminated scene to the camera are modified in accordance with said filter accessory.

* * * * *